(12) United States Patent
Kisch et al.

(10) Patent No.: US 8,311,786 B2
(45) Date of Patent: Nov. 13, 2012

(54) ACCURATE METHODS FOR MODELING THE SPATIAL DISTRIBUTION FOR IRRIGATION SYSTEMS FOR LANDSCAPES

(76) Inventors: Geza Kisch, Riverside, CA (US); Tim Francis Lindsey, Riverside, CA (US); Thomas Carr, Corona, CA (US)

( * ) Notice: Subject to any disclaimer, the term of this patent is extended or adjusted under 35 U.S.C. 154(b) by 571 days.

(21) Appl. No.: 12/555,773

(22) Filed: Sep. 8, 2009

(65) Prior Publication Data

US 2010/0088077 A1     Apr. 8, 2010

Related U.S. Application Data

(60) Provisional application No. 61/102,277, filed on Oct. 2, 2008.

(51) Int. Cl.
*G06G 7/48* (2006.01)
(52) U.S. Cl. .......................................................... 703/6
(58) Field of Classification Search .................. 703/6, 9; 239/225.1, 457; 169/37, 42; 700/79
See application file for complete search history.

(56) References Cited

U.S. PATENT DOCUMENTS

| 4,405,018 | A | | 9/1983 | Fischer | |
|---|---|---|---|---|---|
| 6,145,758 | A | * | 11/2000 | Ogi et al. | 239/457 |
| 6,820,825 | B1 | | 11/2004 | Wang | |
| 7,290,618 | B2 | * | 11/2007 | Thomas et al. | 169/42 |
| 2005/0103887 | A1 | | 5/2005 | McCormick | |
| 2009/0138105 | A1 | | 5/2009 | Crawford | |

* cited by examiner

*Primary Examiner* — Kandasamy Thangavelu
(74) *Attorney, Agent, or Firm* — Krik A. Buhler; Buhler & Associates

(57) ABSTRACT

Accurate methods to model the precipitation rate, water delivery spatial distribution, and distribution uniformity for irrigation systems for landscapes are described. A relatively small set of test data is fitted to empirical and physics-based formulas. This permits the extrapolation of test data for an irrigation system with sprinklers being used with any arbitrary specification of operational and environmental variables. The operational variables are the pressure at the sprinkler head, sprinkler model and nozzle choice, range of arc operation, throw adjustment, head tilt, run time, and spatial position. The environmental variables are the wind profile and three-dimensional terrain topology. The; invention predicts the surface distributions and the three-dimension spatial distributions. Projected onto a landscape surface, this predicts the surface distributions for any arbitrary landscape topology, and includes the effect of wind upon the distribution, and thus provides a very general and realistic irrigation design tool.

17 Claims, No Drawings

ACCURATE METHODS FOR MODELING THE SPATIAL DISTRIBUTION FOR IRRIGATION SYSTEMS FOR LANDSCAPES

CROSS REFERENCE TO RELATED APPLICATION

This application claims the benefit of Provisional 61/102,277 filed Oct. 2, 2008 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This present invention relates generally to the predicting the distribution uniformity of landscape irrigation sprinkler systems under conditions of actual use, and more particularly, to modeling Irrigation distribution under all possible sprinkler operational conditions on three-dimensional terrain In the presence of wind. From the irrigation distribution modeling results, the distribution and efficiency are predicted.

2. Description of Related Art Including Information Disclosed Under 37 CFR 1.97 and 1.98

Modem irrigation systems are designed and operated with the objective of conserving water. The efficiency is the ratio of the amount of the water need by the plants to the amount of water delivered to a landscape. An effective Irrigation design and site operation maximizes the Irrigation efficiency.

Ideally, when an Irrigation system is designed, its efficiency would also be calculated. The design could then be adjusted to maximize the Irrigation efficiency, thus minimizing the water consumption. In practice, it is very difficult to predict the efficiency of an Irrigation system. Instead, the design of irrigation system is often attempted using general rules based on experience. For example, for a rectangular or triangular pattern, the design rule is to use head to head spacing. In this case, distance to the nearest head is the same as the throw distance. It is not always possible to arrange the sprinkler heads Into a regular pattern In this case the recommend spacing must be used along with ones best Judgment. The Irrigation designer usually does not make use of irrigation efficiency calculation.

As modifications to an irrigation system occur, it would be advantageous for the effect on irrigation efficiency to be considered first, but in practice, technicians working in the field have little capability to do this. Technicians usually do not make use of an irrigation efficiency calculation.

In principle, the method for computing irrigation uniformity and efficiency is rather simple. If the distribution for each sprinkler nozzle is known, then the total distribution is obtained by superposition. From the total distribution, the uniformity and efficiency is then calculated. To use this method, one must first obtain measured distribution data. Available test data, such the data provided by the Center for Irrigation Technology at California State University, Fresno, provides distribution data for sprinkler nozzles irrigating flat ground with no wind present. Given this type of data, the irrigation distribution and efficiency can be calculated given the sprinkler positions and primary operational variables. For each sprinkler, these are the range of arc and pressure. This method, however, is very limited in its applicability to real landscapes.

Although the principles behind the computation for irrigation uniformity efficiency are well known, these principles have received only limited application. At the present time, only two products make any use of these principles, and both of these are very limited in their application. One is SPACE PRO™, which is available through the Center for Irrigation Technology at California State University. The other is the irrigation analysis component of LANDLOGIC by Landlogic in Scattsdale, Az. LANDLOGIC is mostly a facility management software tool. Both SPACE PRO™ and LANDLOGIC can only be used on flat terrain and only at a pressure corresponding to the test data.

In reality, to calculate the irrigation efficiency accurately, many other variables must be accounted for. The most important of these is the effect of terrain topology. Sprinklers are often used to irrigate slopes and rolling hill sides. For sprinkler located on slopes, the sprinkler is tilted in the direction of the slope. Typically the tilt angle is chosen to be about one half of the angle corresponding to the slope. The head tilt causes distribution to become asymmetric. The water then falls on an irregular three-dimensional surface, producing additional asymmetry. For this case, a flat ground calculation is not appropriate because the result would be inaccurate. For a slope, not only does the water not fall on a level surface, the sprinkler is not in its vertical upright position as it would be for a flat ground test. Flat ground test data cannot be used to calculate the distribution on slopes, rolling hills, or any other no-flat terrain topology.

Another very signification factor is the effect of wind. Unless the average wind is lower than around 5 miles per hours, using the test data obtained under windless laboratory conditions is also not appropriate because again the predicted results would be inaccurate. The data obtained under windless conditions cannot be used to calculate the distribution when the wind speed exceeds around 5 miles per hour.

In addition to the effect of terrain topology and wind, there are other operational variables that are also important. For modern sprinklers the flow and throw distance can often be adjusted via a screw setting on the sprinkler head. Typically, the reason for using this adjustment is to keep water spray inside the intended irrigation area. For example, one does not wish to irrigate concrete areas such as sidewalks or to irrigate beyond the property line. While flow/throw adjustments are common and have a significant effect on irrigation distribution, data corresponding to the various sprinkler settings is seldom available.

Not only is each of the above described variables important, the combined effect of the various variables is not additive. For example, if one has test data for a 10 mph wind on flat ground, and additionally, one has test data for no wind for a 1:2 slope. One cannot then calculate the distribution for a 10 mph wind going easterly on a west facing 1:2 slopes.

The combined effect of pressure variation, flow/throw setting, head tilt, and wind, produces a very rich variety of Irrigation distributions. To obtain data for all these variables, and all combinations of variables would be unfeasible. It would not be cost effective to conduct all the necessary tests.

At present, irrigated systems for landscapes are designed and operated without the benefit of irrigation efficiency because the current available methods are too limited in their applicability. These are applicable to only the simple case of flat ground with no wind at selected pressures and with the flow/throw adjustment set to the standard position.

There is need for a versatile method to accurately predict landscape irrigation efficiency. Such a method should account for all operational and environmental variables. These are the pressure variation, range of arc operation, flow/throw adjustment, head tilt, terrain topology, and wind. A calculation method with this versatility would be usable to anyone with a need to calculate Irrigation efficiency. The benefit of this kind of calculation would be clearly evident to anyone skilled in the art of irrigation design and operation.

The starting point for any distribution calculation data is measured data. To account for the effects of terrain topology and Wind, three dimensional test data is required. For flat ground testing, it is common to measure the distribution every two feet. For three dimensional testing, it would seem obvious to simply set up water buckets on a two foot grid that is both horizontal and vertical. However, that approach would be impractical. Too many points would be required, and many of these would be difficult to reach from the test floor.

The pressure delivered to each sprinkler nozzle is usually not uniform throughout an irrigated landscape. The pressure variation is due to elevation variation and pressure loss to due to flow through the Irrigation system pipes and equipment. While it is possible to make the pressure more uniform by installing pressure regulating valves, it is very common for an Irrigated site to have unregulated valves. A hydraulic calculation can predict the pressure at each sprinkler. Test data is usually obtained for a few selected pressures with the flow/throw adjustment set to the standard position.

Typically, these pressures are multiples of 10 PSI. What is need is a reliable method to predict irrigation distribution for intermediate pressures and throw settings.

What is a needed is method whereby the three-dimensional distribution may be calculated from the minimal number of test points. In principle, the three-dimensional distribution with wind present could be measured outdoors. However, the wind direction and speed cannot be controlled, and thus, the results would be unrepeatable. What is needed for this case is an alternative method to determine the distribution for a specified wind condition.

BRIEF SUMMARY OF THE INVENTION

The present application embodies ways of predicting the precipitation rate and water delivery spatial distribution for landscapes irrigated by sprinkler devices. From these results, the spatial distribution uniformity and efficiency is calculated. Additionally, this invention introduces a definition of a local irrigation uniformity and efficiency. This quantity is a measure of the spatial distribution uniformity surrounding each irrigation sprinkler.

The use of this invention requires an operational and environmental description of the Irrigation system. The operation description consists of a full description of each irrigation sprinkler. For each irrigation sprinkler, this includes the head model, installed nozzle, range of arc, flow/throw setting, head tilt, spatial position, and delivery pressure. The last quantity is the pressure delivered to the sprinkler at the base of each sprinkler head. Multiple irrigation sprinklers are often controlled from a common valve. The association between valves and sprinkler is part of the operational description. The environmental description consists of elevation information for the landscape and a wind profile. Since wind conditions typically vary, a wind profile consists of the average, and optionally, its variation.

Given the description for each sprinkler, this invention predicts the spatial distribution for each sprinkler. The total spatial distribution is then computed using the principle of superposition.

Each irrigated area is defined by a closed path. Within each irrigated area, there may be sub-interior regions that are not irrigated. The sub-interior regions are also described by a close path. For each irrigation area, the Irrigation uniformity and efficiency is calculated. The overall distribution uniformity and efficiency for the landscape is obtained using an area weight average over all the irrigated areas.

For each sprinkler, a local distribution uniformity and efficiency is also computed. Any location will be closest to one sprinkler. The points closest to one particular sprinkler define a cell area. A distribution uniformity and efficiency are calculated for each cell. In this sense, each sprinkler has a local uniformity and efficiency.

The local distribution uniformity and efficiency calculation pinpoints problems with the Irrigation system. Typically, a site will be required to have a local efficiency exceeding a specified requirement. The local distribution uniformity and efficiency prediction is more useful than the overall average. This is because, for a large area, small problem areas may not have much effect on the overall numerical average. Yet Irrigation schedules for irrigation controllers are set to account for the worst points to ensure that all plants are sufficiently watered. When every sprinkler has local distribution uniformity and efficiency exceeding the specified requirement, the overall distribution uniformity and efficiency for the site will also meet the same specified requirement.

The embodiments of the present invention use interpolation in a transformed coordinated system. Using this method, the precipitation rate for a specific sprinkler can be predicted for conditions where test data is not available. This greatly reduces the amount of testing that must be obtained for each sprinkler nozzle.

To predict the spatial distribution as a function of pressure, test data is required at one or more pressures. Any arbitrary number of test pressures can be used; however, it is best to use at least three different pressures spanning the operation limits of for the nozzle. A good choice is the minimum and maximum pressures limits recommended for the sprinkler by its manufacture, and a pressure midway between the minimum and maximum. Although obtaining test data for these three pressures is recommend, if spatial data from only one pressure is available, but the flow and throw are available for other pressures, then results are predictable for small variations in pressure. The same type of approach is also used to predict effect of a nozzle wear.

The prediction of the spatial distribution as a function of other the parameters such as head tilt, and flow/throw adjustment makes use of a testing for a few specific choices of these parameters. The spatial distribution for arbitrary choices for these parameters is then obtained using interpolation in a transformed coordinate system.

In a preferred embodiment, the present invention uses two dimensional coordinate transformations and function-specific interpolation methods. In contrast to general interpolation where no Information about the characteristic of a function is provided, our function-specific interpolation makes uses of the known operational properties of sprinkler devices. Given data at one or more pressures, the transformation methods are used to predict the spatial distributions at intermediate pressures. Given this data for one more slopes with different inclinations, the transformation methods are used to predict the spatial distribution for intermediate Inclination. Given data for one or more flow/throw adjustments, the transformation methods are used to predict the spatial distribution for intermediate flow/throw adjustments. Given data with no wind and one or more wind condition(s), the transformation methods are used to predict the spatial distribution for intermediate wind conditions. By applying the transforms in succession, the combined effect of variation of multiple parameters is predicted.

In another preferred embodiment, the present invention uses these calculation of flow lines to predict the three dimensional distribution. The flow lines are obtained using a method of best fit given test data on a reference surface and points above and/or below the reference surface. The reference surface should be well sampled with a reasonably fine spacing between test points. The other test points can be relatively sparse and do not need to be arranged into any particular pattern provided they reasonably sample the flow lines.

The surface distribution is obtained by following each flow line from the sprinkler through the air to the ground. The spread in the flow lines are used to predict the three dimensional distribution given two dimensional data on a reference surface. Examples of good choices for a reference surface are flat ground and slopes with a constant tilt.

It should be the noted that although distributions for surface precipitation and water delivery rate are two dimensional quantities, we use a three dimensional flow line method because compared with general interpolation methods, It is more accurate and requires far fewer test points to sample the three dimensional distribution. In general, we find that the number of test points required is only three to five times greater than for a two dimensional surface.

In an alternative embodiment, the flow lines are obtained from analysis of photographs of the sprinklers spray pattern. This method is especially applicable to rotary sprinklers. In this case, the photo is taken when the stream from the sprinkler nozzle is in the image plane of the camera. The shutter speed is set so that the motion of the water drops is observable as a blur. The flow lines are easily seen by eye and good estimate can be obtained by drawing in the flows lines on the photograph by hand. More accurate results are obtained using image processing methods to deduce the flow lines.

In additional embodiment, the trajectories of the water drops are predicted using Newton's equations. These trajectories correspond directly with the flow lines. The trajectories are computed assuming an initial condition and a drag coefficient. For any point on a flow line, the velocity direction is the same as the direction of the flow line. This leaves only two unknown parameters, the velocity magnitude and the drag coefficient. These parameters are obtained by the choice of values such that the predicted trajectories reproduce the previous calculated flow lines.

The initial conditions for each flow line are chosen to be at a point where the stream breaks up into water drops. Newton's equations now reproduce the flow lines previously determined from windless data. By adding terms to Newton's equations for wind force, the trajectories are recomputed. This predicts the flows lines given a wind profile. The spatial distribution is recomputed using the new flow lines. In this way, data obtained under windless conditions can be used to predict the spatial distribution given a wind profile.

As a matter of convention, the term distribution means two a two dimension distribution unless stated otherwise. Hence, the term precipitation rate spatial distribution refers to the distribution along the ground level of the landscape. On the other hand, the term three dimensional distribution refers to the distribution over all of space.

For all the three-dimension methods, the three-dimensional distribution is calculated first. Then given elevation information, the surface distribution is calculated. In the case where wind is present, the wind profile is affected by the terrain topology. In this case, the predicted results for the three-dimensional distribution will be a function of the terrain topology.

These and other embodiments and benefits of the present invention will be clear to those skilled in the art of irrigation and computer modeling after reading the best mode of operation.

Various objects, features, aspects, and advantages of the present invention will become more apparent from the following detailed description of preferred embodiments of the invention, along with the accompanying tables and equations.

BRIEF DESCRIPTION OF THE SEVERAL VIEWS OF THE DRAWING(S)

Not Applicable

DETAILED DESCRIPTION OF THE INVENTION

The details of the preferred embodiments for carrying out the idea of the Invention will be now described. It should be understood that the details are not intended to limit the invention to those details. On the contrary, the details are merely intended to describe the best mode of operation for carrying out the Ideas of the invention. Numerous alternatives, modifications, and equivalents of the embodiments described herein will be apparent to persons skilled in the art of irrigation and computer modeling.

The preferred embodiments of the invention are described for a calculation method to predict the spatial distribution and distribution uniformity of landscapes irrigated by sprinklers. The key idea of the invention is the use of coordinate transforms and physical modeling to predict the spatial distribution of any given sprinkler under all various conditions it may be operated.

Section 1. Calculation Objectives

The variables for this section are listed and defined in the below table.

| | |
|---|---|
| $\vec{r}$ | Spatial Position (x, y, z) |
| $P(\vec{r})$ | Precipitation Rate Function |
| $W(\vec{r})$ | Water Delivery Distribution |
| $\vec{r}_i$ | Spatial Position of ith Sprinkler |
| $P_i(\vec{r})$ | Local Precipitation Rate Distribution Function for $i^{th}$ Sprinkler |
| $t_i$ | Run time for $i^{th}$ Sprinkler |
| $DU_{LQ}$ | Lower Quarter Distribution Uniformity |
| $DU_{Site}$ | Site Distribution Uniformity |

The equations for this section as represented in following equation 1.

$$P(\vec{r}) = \sum_i P_i(\vec{r} - \vec{r}_i) \qquad \text{(Equation 1)}$$

The objective of this invention is to calculate the precipitation rate and water delivery spatial distributions for Irrigation systems, and the corresponding distribution uniformity ratios.

At any spatial position $\vec{r}$ we seek to calculate the precipitation rate $P(\vec{r})$ and water delivery rate $w(\vec{r})$ for a system of irrigation sprinklers. The precipitation at any given point will usually be produced by more than one sprinkler. The spatial position of ith sprinkler is represented by $\vec{r}_i$. The local precipitation rate distribution function for $i^{th}$ sprinkler is represented by $Pi(\vec{r})$. The run time for $i^{th}$ sprinkler is represented by $t_i$.

Given the precipitation rate for each rate for each sprinkler, the total precipitation rate spatial distribution for a collection of sprinklers is calculated using the principle of superposition as shown in equation 1.

When an irrigation area contains different kinds of sprinklers with different average precipitation rates, each kind of sprinkler have a different run time. In this case, it is more relevant to calculate the amount of water delivered. The water delivered by each sprinkler is its precipitation rate times its run time. The water delivery spatial distribution is again calculated using the principle of superposition as represented in following equation 2.

$$W(\vec{r}) = \sum_i t_i P_i(\vec{r} - \vec{r}_i) \quad \text{(Equation 2)}$$

It should be noted that both equations (1) and (2) require as inputs the precipitation rate spatial distribution for each sprinkler. In this invention, we present a general method of predicting the precipitation rate spatial distribution for any sprinkler under any operational or environmental conditions. This prediction method is the core of our Invention.

After the spatial distributions have been calculated, the lower quarter uniformity distribution uniformity ratio is calculated as represented in equation (3) where $DU_{LQ}$ is the lower quarter distribution uniformity. This ratio is the average over the lowest quarter (LQ) precipitation value to the overall average precipitation value within an irrigated area. The lower quarter (LQ) is a state mandated precipitation variable.

$$DU_{LQ} = \frac{LQ \text{ Average precipitation value}}{\text{Avearge precipitation value within an irrigated area}} \quad \text{(Equation 3)}$$

The overall site distribution uniformity (DU) is obtained by computing the area weight average over all irrigated areas as represented in equation (4) where $DU_{Site}$ is the site distribution uniformity.

$$\text{Site } DU = \frac{\sum_i A_i DU_i}{\sum_i A_i} \quad \text{(Equation 4)}$$

Another useful measure of $DU_i$ is the local distribution uniformity as represented in equation (5). That is determined by dividing the minimum amount of water delivered within the local area by the $i^{th}$ sprinkler and the average amount of water delivered over the Irrigated area.

$$DU_i = \frac{\text{Minimum amount of water delivered within local area by } i^{th} \text{ sprinkler}}{\text{Average amount of water delivered over Irrigated Area}} \quad \text{(Equation 5)}$$

In this case, local area is defined to be those points that are closest to a given sprinkler. The local $DU_i$ is the ratio of the minimum value of water that is delivered to a given location by the $i^{th}$ sprinkler within this area to the average over an entire Irrigated area that is watered by each sprinkler. This local $DU_i$ is useful for identifying the specific areas within an irrigated landscape that have poor water distribution uniformity that may cause under or over watering.

Equations (1) to (4) are standard definitions, but they require as inputs that the local precipitation rate spatial distribution function be known for every sprinkler within the Irrigated landscape. In particular, this requires the spatial distribution be obtained for all types of sprinklers and nozzles, and under all operational conditions. In general, this kind of data is not available, thus the calculation of the spatial distributions and distribution uniformities usually not feasible.

This Invention solves this problem by providing a calculation method to predict all of the necessary local precipitation rate spatial distribution functions. Once the local precipitation rate spatial distribution function is calculated for each sprinkler, then equations (1) to (2) are used to calculate the composite spatial distributions for the system of irrigation sprinklers. The corresponding distribution uniformity ratios are then calculated using equations (3) to (5).

Section 2. Calculation Inputs

The inputs and variables for this section are listed and defined in the below table or in the table from the previous section.

| OPERATIONAL VARIABLES | |
|---|---|
| $\vec{r}$ | Spatial Position (x, y, z) |
| PSI | Pressure at Base of Sprinkler Head |
| Head | Head Model |
| Nozzle | Nozzle Choice |
| $\theta_S$ | Start Angle for Range of Arc |
| $\theta_E$ | End Angle for Range of Arc |
| $T_{ADJ}$ | Throw Adjustment |
| $\theta_{HD}$ | Head Tilt |
| t | Run Time |
| ENVIRONMENTAL VARIABLES | |
| z(x, y) | Elevation Function |
| $\vec{v}(\vec{r})$ | Wind Profile Function |

The operational variables for each sprinkler are:

Spatial position ($\vec{r}$) that are horizontal coordinates, such as would be obtained from a map.

The pressure (PSI) at the base of the sprinkler head. This is the pressure which will drive water through the nozzle and produce the spray pattern. The head model (Head) and the nozzle choice (Nozzle).

If the spray pattern for a sprinkler is less than 360 degrees, the spray pattern will be confined to an arc. The arc is specified by the start angle ($\theta_S$) and end ($\theta_E$) angle. The angle defined to be measured counter clockwise from east. This corresponds to the angle as measured with a protractor on a map with the north direction pointing up the page.

For many sprinklers the throw adjust ($T_{ADJ}$) can be adjusted by turning a screw on the sprinkler head. A throw adjustment may also potentially change the flow rate. A throw adjustment is quantified by measuring the new throw distance.

When sprinkler are used to irrigate a slope, the sprinkler is head is tilted ($\theta_{TD}$) in a direction facing down the slope. The tilt angle is typically one half the angle of the slope. Tilting the head will change the spatial distribution produced by the sprinkler. The tilt angle is defined to be the angle between the axis of the sprinkler head and the vertical direction.

The run time (t) is the total time a sprinkler is operated in a given interval of time. This interval may be per cycle or day or any other interval of interest The environmental information consists of the following inputs:

The terrain topology (z(x,y)) includes an elevation function. This is a description of the landscape elevation as function of horizontal position. The elevation profile does not need have absolute accuracy, since only relative height information is needed. In particular, the relative difference in elevation within the throw area for each sprinkler should be specified with an accuracy of about one foot.

The wind profile (v($\vec{r}$)) is a description of the wind velocity as a function of both horizontal position and height. This information may be obtained a number of practical ways:

i) The wind profile can be obtained using the standard logarithmic wind formulas for flow over a surface.

ii) If the terrain topology is complex, the wind profile may be the result for an air flow calculation over the landscape. There exist commercially available software programs that can perform this calculation.

Section 3. Transformation to Dimensionless Variables.

The inputs and variables for this section are listed and defined in the below table or in the tables from the previous sections.

| | |
|---|---|
| P($\vec{r}$) | Precipitation Rate Function for Sprinkler (in/hr) |
| $\vec{r}$ | Displacement Vector from Sprinkler (Local Spatial Position) |
| Φ | Dimensionless Precipitation Rate |
| $\vec{q}$ | Dimensionless Distance from Sprinkler |
| Φ($\vec{q}$) | Dimensionless Precipitation Rate |
| T | Throw Distance from Sprinkler (ft) |
| GPM | Flow Rate (Gallons/min) |

Where P($\vec{r}$) is the precipitation rate function for sprinkler in inches of precipitation per hour (in/hr). Where ($\vec{r}$) is the displacement vector from sprinkler based on the local spatial position. Where φ is a dimensionless precipitation rate. Where q is a dimensionless distance from the sprinkler. Where φ(q) is a dimensionless precipitation rate function. Where T is the throw distance from the sprinkler in feet (ft). Where GPM is the flow rate in gallons per minute.

The key idea of this method is to map the spatial distribution to the unity circle with a coordinate transform. The interpolation is then performed within the transformed coordinate system. Since most sprinkler produce irrigation within a circle, we illustrate this method for the case of circular sprinklers.

For a circular sprinkler, the precipitation rate is a function of only the radial distance from the sprinkler. There is no angular dependence. The precipitation rate is normalized as represented in equation (6) and the distance from the sprinkler head is normalized as represented in equation (7). This produces the dimensionless precipitation rate and dimensionless radial distance respectively.

$$\Phi(r) = \frac{P(r)}{\int_0^T 2\pi r P(r) dr} \quad \text{(Equation 6)}$$

$$\vec{q} = \frac{\vec{r}}{T} \quad \text{(Equation 7)}$$

The transformation back to physical variables is done as represented in equation (8).

$$P(r) = 96.25 \left(\frac{4}{\pi}\right) \frac{GPM}{T^2} \phi(T\vec{q}) \quad \text{(Equation 8)}$$

The advantage of the transformation to dimensionless variables will become apparent in the next section.

Section 4. Spatial Distribution Interpolation for Intermediate Pressures

The inputs and variables for this section are listed and defined in the below table or in the tables from the previous sections.

| | |
|---|---|
| GPM | Flow Rate (gallons/min) |
| T | Throw Distance from Sprinkler (ft) |
| PSI | Pressure (lb/in$^2$) |
| $K_D$ | Nozzle Coefficent |
| x | Exponent |
| $K_T$, $a_k$ | Throw Equation Fitting Coefficents |
| $N_r$ | Number of Radial Interpolation Steps |
| Φ(PSI, i) | Interpolated Dimensionless Spatial Distribution |
| $A_{ik}$ | Fitting Coefficents of Φ function |

We have observed that the most of the variation in precipitation rate spatial distribution results from the variation of flow rate (GPM) and throw distance (T) with pressure. The variation in the dimensionless precipitation rate with changes in pressure is much slower. This result can be seen from equation (8).

As the pressure is varied, the ratio (GPM/T$^2$) varies rapidly, but the shape of the spatial distribution varies slowly. The shape of the spatial distribution is defined by the dimensionless precipitation rate spatial distribution.

We calculate the GPM and throw as a function of pressure using formulas, whereas the dimensionless precipitation spatial distribution for intermediate pressure is calculated by interpolation. In this approach, precipitation rate spatial distribution data is required at one or more pressures. The best approach is to use three pressures. These correspond to the maximum and minimum operation pressures recommended by the manufacturer, and the midpoint pressure. Since the dimensionless precipitation rate spatial distribution varies slowly with pressure, data at just these three pressures is sufficient to accurately interpolate the dimensionless precipitation rate spatial distribution at any arbitrary pressure within the recommend operational pressure range.

Any general interpolation method can be used, but the best method is to resample the data for each pressure into the same number of evenly spaced dimensionless distances as represented in equation (11). Where $N_r$ is the number of radial interpolation steps.

$$r_i = \frac{i}{N_r} \quad (i = 1, 2, 3, \ldots N_r) \quad \text{(Equation 11)}$$

A good choice for the number of re-sample points is 100. A robust method of re-sampling is cubic interpolation. Next, the dimensionless precipitation rate values for each re-sampled point is fitted to a polynomial function of pressure as represented in equation (12), where $\phi(PSI, i)$ is an interpolated dimensionless spatial distribution, where $A_{ik}$ is the fitting coefficients of $\phi$ function, where $N_p$ is the number of pressures interpolation steps or resample points, and k is the exponent of the pressure.

$$\phi(PSI, i) = \sum_{k=0}^{N_p - 1} A_{ik} PSI^k \quad \text{(Equation 12)}$$

The fitting parameters only need to be determined once. Thereafter, equation (12) provides an efficient method of computing the dimensionless precipitation rate for any arbitrary pressure. This method produces values at each of the regularly spaced dimensionless radial positions. The values for arbitrary radial distances are then calculated using linear interpolation.

The GPM for arbitrary pressure is calculated as represented in equation (9). This is a standard equation, well known in the irrigation industry, where $K_G$ is the flow rate of water through a particular nozzle, and x is the exponent of the pressure.

$$GPM = K_G PSI^x \quad \text{(Equation 9)}$$

The throw distance for an arbitrary pressure is calculated as represented in equation (10). We have noticed that this equation provides a good fit to pressure-throw data where $K_T$, $a_k$ is the throw equation fitting coefficients.

$$T = K_T \sqrt{\frac{PSI^x}{1 + \sum_{k=1}^{n} a_k PSI^k}} \quad \text{(Equation 10)}$$

The fitting coefficients in equations (9) and (10) are obtained by fitting to data at a number of different pressures. Again, it best to use three pressures, the maximum and minimum recommended operating pressures and the mid-point pressure.

Note that the flow rate (GPM) and throw distance (T) for arbitrary pressure are calculated using a formula with fitting parameters, whereas the dimensionless precipitation rate spatial distribution $\phi(\vec{r})$ is interpolated. Each of the three quantities, GPM, T, and $\phi(\vec{r})$, are calculated as a function for pressure. These three Quantities are then used in equation (8) to predict the precipitation rate spatial distribution as a function of any arbitrary pressure.

Section 5. Spatial Distribution Interpolation for Nozzle Wear

The interpolation procedure for nozzle wear is similar to procedure in the last section for interpolation for intermediate pressures.

Most of the change in spatial distribution due to nozzle wear is caused by change in GPM and throw distance as the nozzle orifices wears with time. The change in the dimensionless precipitation rate spatial distribution is a secondary factor. The nozzle wear depends on the total run time. For example, if a sprinkler is run 30 minutes a day for 100 days, the total wear time is 50 hours.

The wear rate can be measured by operating a nozzle continuously for a few weeks, and measuring the flow and throw distance every few days. In this way, the fitting coefficients for equations (9) and (10) are determined as function of time. At the end of the test, the spatial distribution is measured, and the dimensionless spatial distribution is calculated. The dimensional spatial distribution for any arbitrary time is then calculated using interpolation.

Using this method the flow rate, throw distance, and dimensionless precipitation rate spatial distributions are predicted as function of time. The corresponding precipitation rate spatial distribution is then calculated using equation (8).

Section 6, Partial Circle Sprinklers

The inputs and variables for this section are listed and defined in the below table or in the tables from the previous sections.

| $\Phi AR$ | Arc Range Angle (degrees) |
|---|---|
| $AF(\vec{r})$ | Arc Factor Function |
| $P(r)$ | Precipitation Rate for 360 degree operation |
| $P(\Phi AR, \vec{r})$ | Precipitation Rate for Partial Circle Operation |
| $\vec{q}$ | Dimensionless Throw Distance Vector |
| $T(\vec{r})$ | Throw Distance in direction of the vector $\vec{r}$ |

The interpolation method for partial circle sprinklers is different, depending on whether it is a rotary or spray sprinkler. The equation for determining the arc range angle is represented in equation 13 where $\phi_{AR}$ is the arc range angle in degrees. Where $\phi_S$ is the start of the arc angle of measurement and $\phi_E$ is the end of the arc angle of measurement.

$$\Phi_{AR} = \Phi_E - \Phi_S \quad \text{(Equation 13)}$$

Rotary sprinklers put out a stream of water that rotates as the sprinkler head turns. The turn rate is usually less than 1 rpm. For a partial circle operation, the rotation reverses direction at the limits of the range of arc. Since the reverse is quick, usually in about a second, the distribution of water within the range of arc is independent of direction. The results of section 5 are applied to partial circle sprinklers by scaling the precipitation rate as represented in equations (14) and (15) where $P(\phi_{AR}, \vec{r})$ is the precipitation rate for partial circle operation.

$$P(\phi_{AR}, \vec{r}) = \frac{360}{\phi_{AR}} P(\vec{r}) AF(\vec{r}) \quad \text{(Equation 14)}$$

$$AF(\vec{r}) = \begin{cases} 1 & \text{within the range of arc} \\ 0 & \text{otherwise} \end{cases} \quad \text{(Equation 15)}$$

For spray sprinklers, the water emerges through slit about the circumference of the nozzle. As the arc is reduced from 360 degrees, the now rate is reduced.

In this case, the relation between precipitation rate and range of arc as represented in equations (16) and (17).

$$P(\phi_{AR}, \vec{r}) = \frac{\phi_{AR}}{360} P(\vec{r}) AF(\vec{r}).$$ (Equation 16)

$$AF(\vec{r}) = \begin{cases} \leq 1 & \text{within the range of arc} \\ 0 & \text{otherwise} \end{cases}$$ (Equation 17)

The water (low at ends of the range of arc is not the same as in the interior of the arc. For this reason the GPM for partial arc sprays does not scale exactly with range of arc. For this case, equation (17) is defined so that values of $AF(\vec{r})$ tapper off near the two ends for the range of arc. This is done in such a way as to produce the measured GPM at the selected range of arc. For example, if quarter arc nozzle has a GPM that is 80% of one fourth of the GPM for full circle operation, then the average of $AR(\vec{r})$ should be 0.8. The rate of tapering is determined by testing.

Section 7. Multi-Stream Circular Sprinklers

Multi-stream rotary sprinklers produce multiple streams. Each stream is equivalent except for the direction of the stream. The orifices are arranged evenly about the nozzle, and the nozzle rotates. These sprinkles can also be used in either full or partial circle operation. For both cases, they can be treated as spray sprinklers using the procedure in section 6. However for partial circle operation, there are no end effects.

Section 8. Asymmetric Sprinklers

For side strip sprinklers, the spray pattern is asymmetric. These the range of arc for these sprinklers is usually 90 or 180 degrees.

This case is treated the same as in the previous sections except that now the throw distance is direction dependent. Let the throw in the direction be denoted as $T(\vec{r})$. Then the normalized position vector as represented in by equation (18).

$$\vec{q} = \frac{\vec{r}}{T(\vec{r})}$$ (Equation 18)

The fitting parameters for the throw using equation (10) are obtained for each direction. As the pressure is varied, the throw equation is used to predict throw distances. Since the distribution will vary with direction, the normalized precipitation rate is interpolated with respect to both radial distance and angle. The spatial distribution is predicted using equation (8) with the term $T^2$ replaced by $(A/\pi)$ where A is the area within the throw. The area A is also interpolated with respect to pressure.

Section 9. Throw Adjustment

The throw adjustment may or may not change the flow. This depends on how the head nozzle device is constructed. The throw adjustment is quantified by measuring the throw as a function of throw adjustment. This adjustment is usually produced by screw setting on the sprinkler head. For a given screw setting, and measurements of the throw and flow at that setting, to first approximation, the spatial distribution is predicted using equation (8) assuming the normalized precipitation rate function does not change.

More precise results are obtained for measuring the distribution for one or two different throw adjustments and using the same interpolation methods as for pressure variation. In this case, the interpolation is with respect to normalized throw adjustment instead of pressure. The normalized throw adjustment is the throw divided the maximum throw.

For Intermediate pressures with a throw adjustment, the spatial distribution is predicted for each test pressure for selected throw adjustment. Then the results are interpolated to the selected pressure.

Section 10. Two Dimensional Transform Method for Wind

The inputs and variables for this section are listed and defined in the below table or in the tables from the previous sections.

| | |
|---|---|
| $T_0$ | Throw Distance from Sprinkler without Wind |
| $\vec{T}$ | Throw Distance Vector with Wind |
| r | Radial Distance from Sprinkler in xy Plane |
| c | Cosine in xy Plane |
| s | Sine in xy Plane |
| $\vec{u}_w$ | Unit Vector for Wind Direction |
| $\vec{r}$ | Radial Displacement from Sprinkler in xy Plane |
| $\vec{r}'$ | Transformed Radial Displacement Spinkler in xy Plane |
| P(r) | Precipitation Rate for No Wind |
| $P^T(\vec{r}')$ | Transformed Precipitation Rate with Wind |
| $g(\vec{r})$ | Geometric Factor |

The spatial distributions for sprinklers operated with a wind blowing can be extrapolated for the case where sprinklers are operated under windless conditions using the following transformation method. The procedure is illustrated for circular sprinklers.

When wind is present the trajectories from the sprinkler head, through the air, and to the ground is altered. This causes a distortion in the spatial distribution of the precipitation rate. The distance the water is thrown from the sprinkler head is also altered.

We have found that end of throw distance fits equation (22) where c and s are the cosine and sine of the angle between the throw direction and the wind as represented by in equations (19) to (21) where r is the radial distance from a sprinkler in the x and y plane and c is the cosine in the x and y plane, s is the sine in the x and y plane. The coefficients as represented by equation (22) are fitted by measuring the throw at three points. A good choice is directly up and down wind from the sprinkler head and at right angles to wind directly outwards from the sprinkler head where T bar is the throw distance vector with wind and $T_0$ is the throw distance from a sprinkler without wind.

$$r = \sqrt{x^2 + y^2}$$ (Equation 19)

$$c = \frac{x}{r}$$ (Equation 20)

$$s = \frac{y}{r}$$ (Equation 21)

$$\vec{T} = T_0(1 + Ac + Bc^2 + Cs^2)$$ (Equation 22)

The lowest order terms of the transformation consistent with equation (22) leads to equation (23). In equation (23), $\vec{u}_w$ is the unit vector in the direction of the wind. The predicted spatial distribution is given by equation (24). In equation (24), the term g(r) is a geometric factor.

$$\vec{r}' = \vec{r} + \left(\frac{r^2}{T_0}\right)(Ac + Bc^2 + Cs^2)\vec{u}_w \quad \text{(Equation 23)}$$

$$P^T(\vec{r}') = \frac{P(\vec{r})}{g(\vec{r})} \quad \text{(Equation 24)}$$

The geometric factor is defined in the following way. Let a small area centered at point $\vec{r}$ be transformed using equation (23). The geometric ratio $g(\vec{r})$ is the ratio of the original area to the projected area.

In principle more terms could be added to equation (23) and the extra coefficients could be determined by fitting the prediction of equation (24) to test data. In practice, however, data collected under conditions of wind is rather unrepeatable. This is due larger to the fact that the wind conditions will not usually remain constant long enough to complete a test. Nevertheless, equations (23) and (24) provide a reasonably accurate method of prediction.

The coefficients in equations (23) and (24) will depend on the wind speed. The coefficients can be determined for a number of wind speed and the values interpolated for intermediate wind speeds.

It should be noted that once the transformation is determined, it can be applied to any of the predicted results from the previous sections. Using this method, the spatial distribution obtained under windless conditions is transformed for a wind with a specified velocity.

Section 11. Two Dimensional Transform Method for Slopes

The inputs and variables for this section are listed and defined in the below table or in the tables from the previous sections.

| | |
|---|---|
| $T_0$ | Throw Distance from Sprinkler on Level Ground |
| $\vec{T}$ | Throw Distance Vector on Slope |
| r | Radial Distance from Sprinkler in xy plane |
| c | Cosine in xy Plane |
| s | Sine in xy Plane |
| $\theta_{Nz}$ | Nozzle Pitch Angle |
| $\theta_{Ht}$ | Head Tilt Angle |
| $\theta_{Htd}$ | Head Tilt Direction Angle |
| $\theta_{Hr}$ | Head Rotation Angle |
| $R_{xy}(\theta)$ | Rotation Matrix for Rotation θ in xy Plane |
| $R_{zx}(\theta)$ | Rotation Matrix for Rotation θ in zx Plane |
| $\vec{u}_x$ | Unit vector in x direction |
| $\vec{u}'$ | Nozzle Direction Unit Vector |
| $\vec{v}_{xy}$ | Projection of $\vec{u}'$ onto xy Plane |
| $\vec{r}$ | Horizontal Radial Displacement from Sprinkler |
| $\vec{r}'$ | Transformed Horizontal Radial Displacement Spinkler |

The spatial distributions for sprinklers operated on level ground can be extrapolated for the case where sprinklers are used to irrigate slopes using the following transformation method. The procedure is illustrated for circular sprinklers.

When a slope is irrigated with sprinklers its head is tilted in the direction of the slope. The tilt angle is typically set to about one half of the angle of Inclination of the slope.

We have found that for this case, the end of throw distance also fits equation (22). The coefficients are fitted by measuring the throw at three points. A good choice is to directly up and down the slope from the head and at right angles directly outward from the head. In practice the throw distances are measure along the ground with a tape measure. These distances are converted to horizontal distance by dividing the throws by the cotangent of the slope inclination angle.

When the head is tilted the direction of water velocity exiting the nozzle is also rotated. This rotation depends on the nozzle pitch, head rotation angle, head tilt angle, and the head tilt direction. The matrix equations for the rotational transformation produced by this rotation are represented in equations (25) to (27).

$$R_{xy}(\theta) = \begin{pmatrix} \cos(\theta) & -\sin(\theta) & 0 \\ \sin(\theta) & \cos(\theta) & 0 \\ 0 & 0 & 1 \end{pmatrix} \quad \text{(Equation 25)}$$

$$R_{zx}(\theta) = \begin{pmatrix} \cos(\theta) & 0 & -\sin(\theta) \\ 0 & 1 & 0 \\ \sin(\theta) & 0 & \cos(\theta) \end{pmatrix} \quad \text{(Equation 26)}$$

$$\vec{u}' = R_{xy}(\theta_{Htd})R_{zx}(-\theta_{Ht})R_{xy}(\theta_{Hr})R_{zx}(\theta_{Nz})u_x \quad \text{(Equation 27)}$$

The resulting transformation as represented in equation (28).

$$\vec{r}' = \left(r + \frac{r^2}{T}(Ac + Bc^2 + Cs^2)\right)\vec{v}_{xy} \quad \text{(Equation 28)}$$

This transformation can be made more accurate by additional terms and determining the extra coefficients solving for the values that provide the best match to the measured test data. Since the amount of water within any differential arc must is conserved, the expansion function term would be a product of a function of r and function of c and s. This leads to what is represented in equation (29).

$$\vec{r}' = (r + f_1(r)f_2(c,s))\vec{v}_{xy} \quad \text{(Equation 29)}$$

This method has an advantage that is not obvious. The transformation method will conserve the amount of water within each differential arc. This will correct for Inaccuracies of the test data.

The transformation coefficients are determined for a number of different slopes. The values for other slopes are found by interpolation. In way, the transform for an arbitrary slope is predicted.

It should be noted that once the transformation is determined, it can be applied to any of the predicted results of the previous sections. Using this method, the spatial distribution for a flat ground test is transformed to a slope with specified inclination.

Section 12. Three-dimensional Flow Line Method

The inputs and variables for this section are listed and defined in the below table or in the tables from the previous sections.

| | |
|---|---|
| $\vec{r}$ | Horizontal Radial Displacement from Sprinkler |
| $\vec{r}'$ | Transformed Horizontal Radial Displacement Spinkler |
| $T_0$ | Throw Distance from Sprinkler on Level Ground |
| $\vec{T}(s)$ | Horizontal Throw Distance Vector for Inclination s |
| q | Dimensionless Horizonal Radial Distance from Sprinkler |
| q' | Transformed Dimensionless Horizontal Radial Distance |
| P(q, 0) | Precipitation Rate on Level Ground |
| $P^T$(q', s] | Tranformed Precipitaion Rate in Three Dimenional Space |

In this section, the three-dimensional precipitation rate distribution is calculated from the water flow lines. As the water travels form the sprinkler head, through the air, and to the ground, its paths define flow lines. As the flow lines spread apart, the precipitation rate correspondingly decreases.

To carry out this calculation, we introduce a new co-ordinate system as represented in equations (30)-(32).

$$r = \sqrt{x^2 + y^2} \quad \text{(Equation 30)}$$

$$s = \frac{z}{r} \quad \text{(Equation 31)}$$

$$q = \frac{r}{T(s)} \quad \text{(Equation 32)}$$

For the case of circular symmetry, a point (q, 0) on the level plane passing through the sprinkler head is transformed to points (q', s) along the flow line. The transformation from the point (q, 0) to the points (q', s) as represented in equation (33).

$$q' = q + (1-q)(A_1 q + A_2 s + A_3 q^2 + A_4 q s + A_5 s^2 + \ldots) \quad \text{(Equation 33)}$$

The corresponding precipitation rate is calculated as represented using equation (34).

$$P^T(q', s) = \frac{P(q, 0)}{g(s, q)} \quad \text{(Equation 34)}$$

In equation (34), the term q(s, q) is the geometric factor at the point (s, q). To obtain this factor, a small area is transformed. The geometric factor is the ratio of the transformed area to the original area.

To determine the fitting coefficients in equation (33), a number of different approaches may be used. One method is to collect precipitation data along lines in different direction moving outward from the sprinkler head. The precipitation rate is integrated along these lines. In this integration, the precipitation rate is weighted by the distance from the sprinkler head. Points that integrate to the same value correspond to the same flow line.

Another more general method is to collect precipitation rate data over points distributed in three dimensions. The level plane distribution is transformed using equation (33) to each of the other collection points, and the corresponding precipitation rate is predicted using equation (34). The transformation coefficients determined by solving for the best least square fit between the predicted and observed precipitation rates.

Section 13. Surface Precipitation Rate Spatial Distribution.

Given an evaluation model for the landscape, the three-dimensional precipitation rate distribution is evaluated at the landscape surface. This produces the surface precipitation rate spatial distribution. Thus, using the three-dimensional flow line method, the precipitation rate spatial distribution on the plane level with the sprinkler head is transformed to any arbitrary landscape surface topology.

Section 14. Photographic Trajectory Tracing Method

For rotary sprinklers, the flow lines are readily apparent from a photograph of the spray pattern. The photo is taken when the stream is in the Image plane of the camera. The shutter speed is set so that the velocity direction is observable as a blur.

The trajectories of the water drops are easily observable in photographs, and a reasonable sketch of the trajectories could be drawn by hand. A more precise method is as follows: Using the method of section 12, the flow direction vector for any point is calculated. For each point the flow direction is also determined from the photograph. The error measure is the dot product between the direction vector in the photograph and the transformation prediction. The coefficients of the transform are determined by the method of best fit.

Section 15. Aerodynamic Water Drop Model

The inputs and variables for this section are listed and defined in the below table or in the tables from the previous sections.

| | |
|---|---|
| $\vec{v}$ | Velocity Vector |
| g | Gravitational Acceleration (32 ft/sec$^2$) |
| $\alpha$ | Acceleration Vector |
| $\rho_{air}$ | Density of Air |
| $\rho_{water}$ | Density of Water |
| $D_w$ | Effective Diameter of Water Drop |
| $C_D$ | Aerodynamic Drag Coefficent |
| K | Coefficient of Drag |
| Re | Reynolds Number |
| $u_{air}$ | Viscosity of Air |
| $\alpha_0, \alpha_1, \alpha_2$ | Stream Trajectory Fitting Parameters |
| $v_I$ | Exit Velocity from nozzle (ft/sec) |
| $\vec{v}_{wind}$ | Wind Velocity Vector |
| $\vec{v}_f$ | Friction Velocity Vector |
| $z_0$ | Surface Roughness |

The Newton's equations of motion for a water drop subject the drag force due motion through air as represented by equation (35) where the coefficient of drag, K is calculated as represented using equations (36) to (38).

$$\vec{a} = -g\vec{z} - Kv\vec{v} \quad \text{(Equation 35)}$$

$$K = \left(\frac{3}{4}\right)\left(\frac{\rho_{air}}{\rho_{water}}\right)\left(\frac{C_D}{D_w}\right) \quad \text{(Equation 36)}$$

$$C_D = \frac{24}{\text{Re}} + 1 \quad \text{(Equation 37)}$$

$$Re = \frac{\rho_{air} v D_w}{\mu_{air}} \quad \text{(Equation 38)}$$

Equation (35) is easily solved using the fourth order Runga-Kutta method. The Initial condition for each trajectory is chosen for each flow line at a point just after the stream has broken up into water drops.

The flow lines obtained in section 12 are the trajectory lines predicted by equation (35). For any point on a flow line, the velocity direction is along the direction of the flow line. In principle, this leaves only two unknowns, the velocity magnitude and the drag coefficient. In practice, we find that there are families of parameters that produce nearly the same trajectories. Instead, the velocity can be measured using the photographic method described in section 13. The blur distance vector divided by the shutter speed gives the velocity of the water drops. Once, the velocity and drag coefficient are determined, then the equation (35) predicts the trajectory.

The trajectory from the nozzle to the initial condition for the water drop calculation is obtained as represented by using equation (39).

$$\vec{a} = -g\vec{z} + (a_0 + a_1 t + a_2 t^2)\frac{\vec{v}}{|\vec{v}|} \quad \text{(Equation 39)}$$

The initial velocity direction is determined by the pitch of the nozzle. The initial velocity magnitude in feet per sec is calculated as represented in equation (40).

$$v_f = 12.19\sqrt{PSI} \quad \text{(Equation 40)}$$

The fitting coefficients for equation (39) are determined by matching to the initial condition for the water drop trajectories.

Using this method Newton's equations reproduce the flow lines obtained using the methods in section 12.

When the head is tilted, the initial velocity vector is rotated uses equations (25) to (27). Then equation (35) is solved again using the new Initial condition. This produces a new set of flow lines, and the resulting spatial distribution is calculated using the procedure in section 12. In this way the spatial distribution for the standard head tilt can be transformed for any arbitrary head tilt.

Section 16. Wind Modeling

When wind is present, Newton's equations are modified by adding replacing the velocity term in equation (35) with the velocity relative to the wind as represented by equation (41).

$$v_f = 12.19\sqrt{PSI} \quad \text{(Equation 40)}$$

$$\vec{v} \rightarrow \vec{v} - \vec{v}_{wind} \quad \text{(Equation 41)}$$

Given a wind profile equation (35) is solved again using the fourth order Runga-Kutta method. One good choice for a wind profile is the standard logarithmic wind profile as represented in equation (42).

$$v_{wind} = v_f \ln\left(\frac{z}{z_0} + 1\right) \quad \text{(Equation 42)}$$

For a given type of plant covering, the surface roughness is available in tables. The friction velocity is obtained by measuring the wind speed at a height, and solving using equation (42). For complex terrains, it may be necessary to use fluid dynamic program to model the air flow of the terrain surface. However the wind profile is obtained, given a model for the wind, the results of this section transform the spatial distribution under windless conditions to conditions where wind is present.

Potential Applications

Among the many various potential applications of this invention, there two applications that we are aware of for which our methods will have an immediate application.

First, during the planning and design of an irrigation system, an irrigation designer can use our invention to obtain a numerical measure of the irrigation distribution uniformity. This provides an objective means of determining whether or not a proposed design meets planning and/or regulatory requirements. Often, one of the irrigation system requirements is that the distribution uniformity will exceed a minimum requirement. The alternative to using this invention is the current practice of using design rules without performing a distribution uniformity calculation. The deficiency of that method is that the irrigation designer does not really know for sure whether his or her design meets the required distribution uniformity requirement.

Second, after a site has been constructed, and possibly modified after initial design, a survey of the irrigation system may produce Irrigation as-built. The as built provides description of the sprinkler heads and installed nozzle choice and the corresponding spatial positions. This information, together with a specification of the operational variables such as pressure, throw adjustments, head tilt, etc., together with the elevation and wind profile for the site may form a complete specification of the operational and environmental variables for the irrigation system. Given this information, the invention can perform an electronic water audit. The alternative to this is the common practice of placing a course grid of water buckets within selected small areas of the site. Each of these areas covers usually just a few serving areas, corresponding to running just a few irrigation valves. The deficiency of the approach is that is known to be inaccurate, and in particular, produces results that may have a poor repeatability.

The advantage of our invention, applied to either a proposed design or an existing as built design, is that the calculation is highly accurate and these results can be obtained nearly real-time. Changes to a proposed or as-built design can be tested first on the computer. That is after, each change is introduced to a design, the resulting Irrigation spatial distribution is predicted and the result distribution uniformity is calculated thus, different solutions for Irrigation problems that may exist can be first tested on the computer prior to Implementation. This will significantly reduce the time and expense for Irrigation design verification and irrigation system operational management.

Thus specific embodiments of an accurate method for modeling the spatial distribution for irrigation systems for landscapes have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A method for predicting surface and three-dimensional precipitation and water delivery rate spatial distributions for landscapes irrigated by sprinklers comprising:
   identifying at least one sprinkler head;
   determining a pressure at said at least one sprinkler head;
   determining a nozzle on said at least one sprinkler head;
   determining a range of arc operation of said at least one sprinkler head;
   determining a head tilt of said at least one sprinkler head;
   determining a head tilt direction of said at least one sprinkler head;
   determining a throw distance of said at least one sprinkler head;
   determining a run time of said at least one sprinkler head;
   determining a sprinkler location of said at least one sprinkler head;
   determining at least one environmental variable of said at least one sprinkler head, and
   predicting a local distribution uniformity as represented by a following equation 5

$$DU_i = \frac{\text{Minimum amount of water delivered within local area by } i^{th} \text{sprinkler}}{\text{Average amount of water delivered over Irrigated Area}} \quad \text{(Equation 5)}$$

where $DU_i$ is the local distribution uniformity;
and using said local distribution uniformity to predict optimal sprinkler placement to improve distribution uniformity over said irrigated area.

2. The method according to claim 1 wherein said environmental variable is selected from a group comprising a landscape elevation as a function of horizontal position and a wind profile for an irrigated site.

3. The method according to claim 1 that further includes prediction of said local distribution uniformity for each individual sprinkler given each sprinkler's operational variables.

4. The method according to claim 3 that further includes prediction of a total spatial distribution uniformity for an Irrigated system using a principle of superposition.

5. The method according to claim 1 wherein results of the method are used to predict a distribution uniformity (DU) for any irrigated region of a landscape and an overall distribution uniformity for an entire irrigated site.

6. The method according to claim 5 wherein said results use a standard definition of a lower quarter distribution uniformity.

7. The method according to claim 6 wherein said standard definition of said lower quarter distribution uniformity is used to determine either a precipitation rate or a water delivery spatial distribution.

8. The method according to claim 1 that is used to accurately interpolate spatial distributions for any arbitrary pressure, range of arc for partial arc sprinkler, and nozzle wear as defined by a following equations (6) to (18)

$$\Phi(r) = \frac{P(r)}{\int_0^T 2\pi r P(r)\,dr} \quad \text{(Equation 6)}$$

$$\vec{q} = \frac{\vec{r}}{T} \quad \text{(Equation 7)}$$

$$P(r) = 96.25\left(\frac{4}{\pi}\right)\frac{GPM}{T^2}\phi(T\vec{q}) \quad \text{(Equation 8)}$$

$$GPM = K_G PSI^x \quad \text{(Equation 9)}$$

$$T = K_T \sqrt{\frac{PSI^x}{1 + \sum_{k=1}^{n} a_k PSI^k}} \quad \text{(Equation 10)}$$

$$r_i = \frac{i}{N_r} (i = 1, 2, 3, \ldots N_r) \quad \text{(Equation 11)}$$

$$\phi(PSI, i) = \sum_{k=0}^{N_p-1} A_{ik} PSI^k \quad \text{(Equation 12)}$$

$$\Phi_{AR} = \Phi_E - \Phi_S \quad \text{(Equation 13)}$$

$$P(\phi_{AR}, \vec{r}) = \frac{360}{\phi_{AR}} P(\vec{r}) AF(\vec{r}) \quad \text{(Equation 14)}$$

$$AF(\vec{r}) = \begin{cases} 1 & \text{within the range of arc} \\ 0 & \text{otherwise} \end{cases} \quad \text{(Equation 15)}$$

$$P(\phi_{AR}, \vec{r}) = \frac{\phi_{AR}}{360} P(\vec{r}) AF(\vec{r}). \quad \text{(Equation 16)}$$

$$AF(\vec{r}) = \begin{cases} \leq 1 & \text{within the range of arc} \\ 0 & \text{otherwise} \end{cases} \quad \text{(Equation 17)}$$

$$\vec{q} = \frac{\vec{r}}{T(\vec{r})}. \quad \text{(Equation 18)}$$

where:
$\phi(r)$ is a dimensionless displacement vector;
$P(r)$ is a precipitation rate function for a sprinkler;
$r$ is a displacement;
$\vec{g}$ is a dimensionless distance from the sprinkler,
$\vec{r}$ is a displacement vector from the sprinkler;
$T$ is a throw distance from the sprinkler;
GPM is flow rate in gallons per minute;
$\phi(T\vec{q})$ is a dimensionless precipitation rate for sprinkler throw distance;
$K_G$ is a dimensionless throw for a nozzle at an arbitrary pressure;
PSI is an arbitrary pressure;
x is an exponent of the pressure;
$K_T$ is a throw equation fitting coefficient;
$a_k$ is a throw equation fitting coefficient;
k is an exponent of the pressure;
$r_i$ is a resampling of the data for each i;
i is a number of samples;
$N_r$ is a number of radial interpolation steps;
$\phi(PSI, i)$ is interpolated dimensionless spatial distribution;
$N_p$ is a number of resamples fitted to a polynomial of pressure;
$A_{ik}$ is a fitting coefficient of the $\phi$ function;
$\phi AR$ is a arc range angle in degrees;
$\phi_S$ is a start of an arc angle of measurement and $\phi_E$ is a end of the arc angle of measurement;
$P(\phi_{AR}, \vec{r})$ is a precipitation rate for partial circle operation;
$P(\vec{r})$ is precipitation rate for throw;
$AF(\vec{r})$ is arc factor function, and
$T(\vec{r})$ is throw distance in direction of the vector $\vec{r}$.

9. The method according to claim 1 that further includes a formula for predicting the throw distance as defined by a following equation (10), $$T = K_T \sqrt{\frac{PSI^x}{1 + \sum_{k=1}^{n} a_k PSI^k}}. \quad \text{(Equation 10)}$$

where:
T is a throw distance from a sprinkler;
$K_T$ is a throw equation fitting coefficient;
PSI is an arbitrary pressure
x is an exponent of the pressure;
$a_k$ is a throw equation fitting coefficient, and
k is an exponent of the pressure.

10. The method according to claim 1 that further includes a two-dimensional transform method for wind as defined by a following equations (19) to (24), $$r = \sqrt{x^2 + y^2} \quad \text{(Equation 19)}$$

$$c = \frac{x}{r} \quad \text{(Equation 20)}$$

$$s = \frac{y}{r} \quad \text{(Equation 21)}$$

$$\vec{T} = T_0(1 + Ac + Bc^2 + Cs^2) \quad \text{(Equation 22)}$$

$$\vec{r}' = \vec{r} + \left(\frac{r^2}{T_0}\right)(Ac + Bc^2 + Cs^2)\vec{u}_w \quad \text{(Equation 23)}$$

$$P^T(\vec{r}') = \frac{P(\vec{r})}{g(\vec{r})} \quad \text{(Equation 24)}$$

where:
r is a radial distance from a sprinkler in a xy plane;
c is cosine in the xy plane;
s is sine in the xy plane;
$\vec{T}$ is a throw distance vector with wind
$T_0$ is throw distance from the sprinkler without wind;
A, B and C are three points of sprinkler throw;
$\vec{r}$ is a displacement vector from the sprinkler;
q(r) is a geometric factor;
$\vec{u}_w$ is a unit vector for wind direction;
$P^T(\vec{r}')$ is a transformed precipitation rate with wind, and
$P(\vec{r})$ is a precipitation rate for the throw,
and said two-dimensional transform method for wind further predicts a spatial distribution using measurements of a throw distance as a function direction from said at least one sprinkler head.

11. The method according to claim 10 wherein a spatial distribution is predicted with given a wind profile, and said two-dimensional transform method further predicts a surface distribution for an arbitrary terrain topology under known wind conditions.

12. A method for calculating a two-dimensional transform for irrigated slopes comprising:
identifying at least one sprinkler head;
determining a pressure at said at least one sprinkler head;
determining a nozzle on said at least one sprinkler head;
determining a head tilt of said at least one sprinkler head;
determining a head tilt direction of said at least one sprinkler head;
determining a throw distance of said at least one sprinkler head;
determining at least one environmental variable of said at least one sprinkler head;
applying components for said at least one sprinkler head to a following equations (25) to (29), $$R_{xy}(\theta) = \begin{pmatrix} \cos(\theta) & -\sin(\theta) & 0 \\ \sin(\theta) & \cos(\theta) & 0 \\ 0 & 0 & 1 \end{pmatrix} \quad \text{(Equation 25)}$$

$$R_{zx}(\theta) = \begin{pmatrix} \cos(\theta) & 0 & -\sin(\theta) \\ 0 & 1 & 0 \\ \sin(\theta) & 0 & \cos(\theta) \end{pmatrix} \quad \text{(Equation 26)}$$

$$\vec{u}' = R_{xy}(\theta_{Hdt})R_{zx}(-\theta_{Ht})R_{xy}(\theta_{Hr})R_{zx}(\theta_{Nz})u_x \quad \text{(Equation 27)}$$

$$\vec{r}' = \left(r + \frac{r^2}{T}(Ac + Bc^2 + Cs^2)\right)\vec{v}_{xy} \quad \text{(Equation 28)}$$

$$\vec{r}' = (r + f_1(r)f_2(c,s))\vec{v}_{xy} \quad \text{(Equation 29)}$$

where:
θ is an angle;
$R_{xy}(\theta)$ is a rotation matrix for rotation in an xy plane;
$R_{zx}(\theta)$ is a rotation matrix for rotation in an zx plane;
$\vec{u}'$ is a nozzle direction unit vector;
$\theta_{Hdt}$ is head tilt direction angle;
$\theta_{Ht}$ is head tilt angle;
$\theta_{Hr}$ is head rotation angle;
$\theta_{Nz}$ is nozzle pitch angle;
$u_x$ is unit vector in x direction;
$\vec{r}'$ is a transformed horizontal displacement vector from a sprinkler;

r is a radial distance from a sprinkler in the xy plane;
c is cosine in xy plane;
T is a throw distance from a sprinkler;
s is sine in xy plane;
A, B and C are three points of sprinkler throw;
$f_1$ and $f_2$ are products of a function;
$\vec{v}_{xy}$ is a projection of $\vec{v}'$ onto the xy plane, and
whereby said equations predict a spatial distribution using measurements of a throw distance as a function of direction from said sprinkler head, and
using said predicted spatial distribution to predict optimal sprinkler placement to improve distribution uniformity over said Irrigated slopes.

13. The method according to claim 12 that further includes an aerodynamic model for predicting the water drops trajectories by applying a following equations (35) to (42), $$\vec{a} = -g\vec{z} - Kv\vec{v} \quad \text{(Equation 35)}$$

$$K = \left(\frac{3}{4}\right)\left(\frac{\rho_{air}}{\rho_{water}}\right)\left(\frac{C_D}{D_w}\right) \quad \text{(Equation 36)}$$

$$C_D = \frac{24}{\text{Re}} + 1 \quad \text{(Equation 37)}$$

$$\text{Re} = \frac{\rho_{air}vD_w}{\mu_{air}} \quad \text{(Equation 38)}$$

$$\vec{a} = -g\vec{z} + (a_0 + a_1t + a_2t^2)\frac{\vec{v}}{|\vec{v}|} \quad \text{(Equation 39)}$$

$$v_I = 12.19\sqrt{PSI} \quad \text{(Equation 40)}$$

$$\vec{v} \rightarrow \vec{v} - \vec{v}_{wind} \quad \text{(Equation 41)}$$

$$v_{wind} = v_f \ln\left(\frac{z}{z_0} + 1\right) \quad \text{(Equation 42)}$$

where:
$\vec{a}$ is an acceleration vector;
$g\vec{z}$ is gravity;
$Kv\vec{v}$ is drag;
K is coefficient of drag;
$\rho_{air}$ is density of air;
$\rho_{water}$ is density of water;
$C_D$ is aerodynamic drag coefficient;
$D_w$ is effective diameter of a water drop;
Re is Reynolds number;
$\mu_{air}$ is drag from air;
$a_0$, $a_1t$ and $a_2t^2$ are stream trajectory fitting parameters;
$v_I$ is an exit velocity of from a nozzle (ft/sec);
$\vec{v}$ and $\vec{v}_{wind}$ are wind profile;
$v_f$ is wind velocity;
z and $z_0$ are vectors in wind velocity,
and further coupling solutions from said method to a steam model for water emerging from said sprinkler head.

14. The method according to claim 13 wherein a spatial distribution is predicted with given a wind profile, and said two-dimensional transform method further predicts a surface distribution for an arbitrary terrain topology under known wind conditions.

15. A method for determining three-dimensional flow line comprising:
identifying at least one sprinkler head;
determining a pressure at said at least one sprinkler head;
determining a nozzle on said at least one sprinkler head;

determining a range of arc operation of said at least one sprinkler head;
determining a head tilt of said at least one sprinkler head;
determining a head tilt direction of said at least one sprinkler head;
determining a throw distance of said at least one sprinkler head;
determining a sprinkler location of said at least one sprinkler head;
predicting a three-dimensional flow line by applying components for said at least one sprinkler head to a following equations (30) to (34);

$$r = \sqrt{x^2 + y^2} \quad \text{(Equation 30)}$$

$$s = \frac{z}{r} \quad \text{(Equation 31)}$$

$$q = \frac{r}{T(s)}. \quad \text{(Equation 32)}$$

$$q' = q + (1-q)(A_1 q + A_2 s + A_3 q^2 + A_4 q s + A_5 s^2 + \dots) \quad \text{(Equation 33)}$$

$$P^T(q', s) = \frac{P(q, 0)}{g(s, q)} \quad \text{(Equation 34)}$$

where:
r is radial displacement from the sprinkler using the x and y distances;
s is inclination in the z direction over the radial displacement;
q is dimensionless horizontal distance from the at least one sprinkler;
T(s) is horizontal throw distance for inclination s;
q' is transformed dimensionless horizontal radial distance;
$A_n$ is the coverage area of each sprinkler;
P(q, 0) is a precipitation rate on level ground;
G(s, q) is the geometric factor at the point (s, q);
$P^T$(q', s) is a transformed precipitation rate in three-dimensional space;
to extrapolate a spatial distributions on flat ground, obtaining a three-dimensional spatial distribution, and
when projecting said three-dimensional spatial distribution onto a terrain surface, said equations predict a surface distribution for an arbitrary terrain topology; and using said three-dimensional spatial distribution to predict optimal sprinkler placement to improve distribution of water in said three-dimensional flow lines.

16. The method according to claim 15 that further includes an aerodynamic model for predicting the water drops trajectories by applying a following equations (35) to (42), $$\vec{a} = -g\vec{z} - Kv\vec{v} \quad \text{(Equation 35)}$$

$$K = \left(\frac{3}{4}\right)\left(\frac{\rho_{air}}{\rho_{water}}\right)\left(\frac{C_D}{D_w}\right) \quad \text{(Equation 36)}$$

$$C_D = \frac{24}{\text{Re}} + 1 \quad \text{(Equation 37)}$$

$$\text{Re} = \frac{\rho_{air} v D_w}{\mu_{air}} \quad \text{(Equation 38)}$$

$$\vec{a} = -g\vec{z} + (a_0 + a_1 t + a_2 t^2)\frac{\vec{v}}{|\vec{v}|} \quad \text{(Equation 39)}$$

$$v_I = 12.19\sqrt{PSI} \quad \text{(Equation 40)}$$

$$\vec{v} \rightarrow \vec{v} - \vec{v}_{wind} \quad \text{(Equation 41)}$$

$$v_{wind} = v_f \ln\left(\frac{z}{z_0} + 1\right) \quad \text{(Equation 42)}$$

where:
$\vec{a}$ is an acceleration vector;
$g\vec{z}$ is gravity;
K is coefficient of drag
$Kv\vec{v}$ is drag;
$\rho_{air}$ is density of air;
$\rho_{water}$ is density of water;
$C_D$ is aerodynamic drag coefficient;
$D_w$ is effective diameter of a water drop;
Re is Reynolds number;
$\mu_{air}$ is drag from air;
$a_0$, $a_1 t$ and $a_2 t^2$ are stream trajectory fitting parameters;
$v_I$ is a velocity constant based upon the water pressure;
$v_f$ is a velocity;
$\vec{v}$ and $\vec{v}_{wind}$ are wind profile;
z and $z_0$ are vectors in wind velocity,
and further coupling solutions from said method to a steam model for water emerging from said sprinkler head.

17. The method according to claim 16 wherein a spatial distribution is predicted with given a wind profile, and said three-dimensional flow line method further predicts a surface distribution for an arbitrary terrain topology under known wind conditions.

* * * * *